July 23, 1963 T. D. EVANS Re. 25,419
AUTOMATIC ELECTRIC MOP
Original Filed July 9, 1958 4 Sheets-Sheet 1
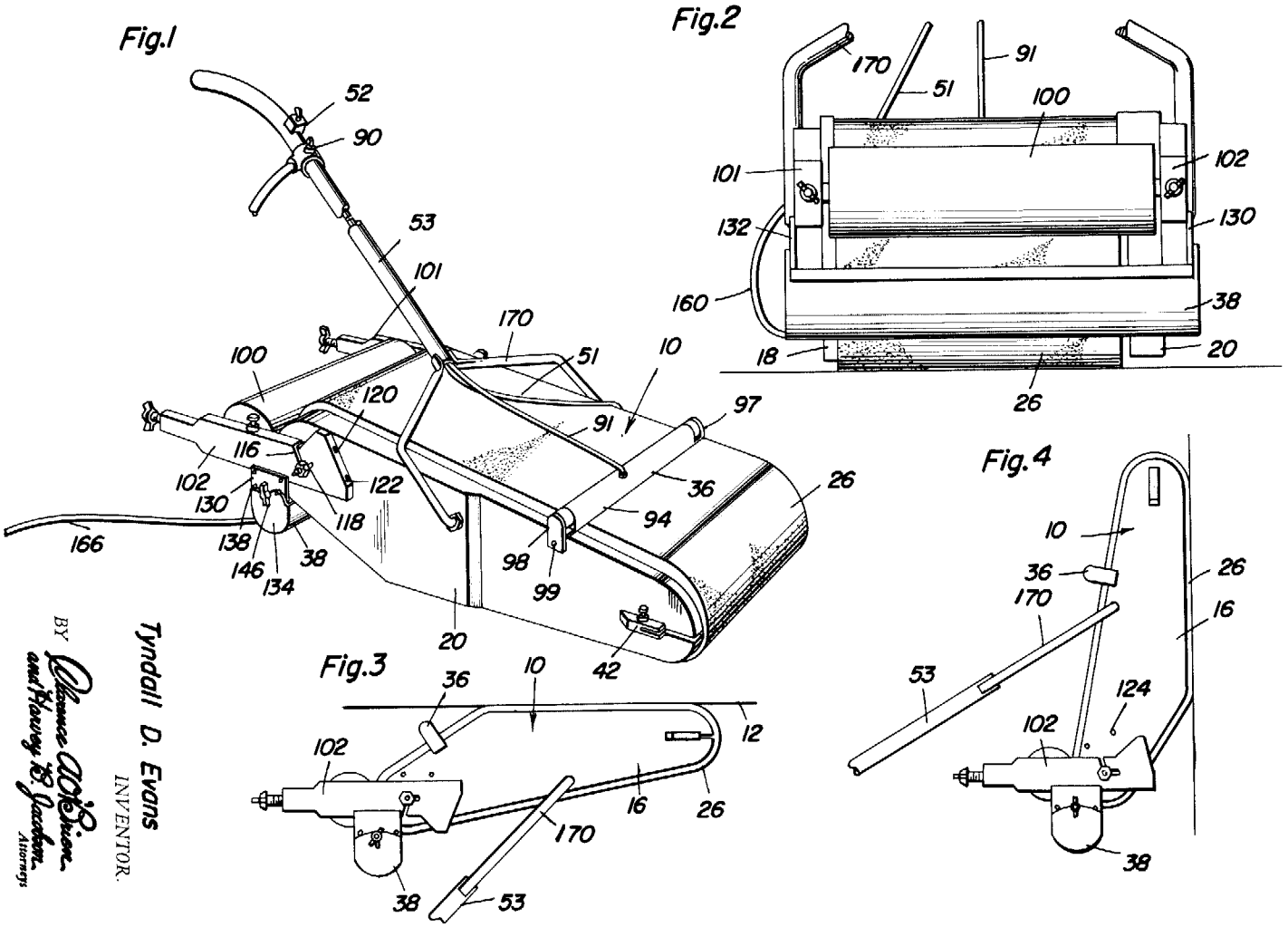
Tyndall D. Evans
INVENTOR.
BY Clarence A. O'Brien and Harvey B. Jacobson
Attorneys AUTOMATIC ELECTRIC MOP
Original Filed July 9, 1958 4 Sheets-Sheet 2
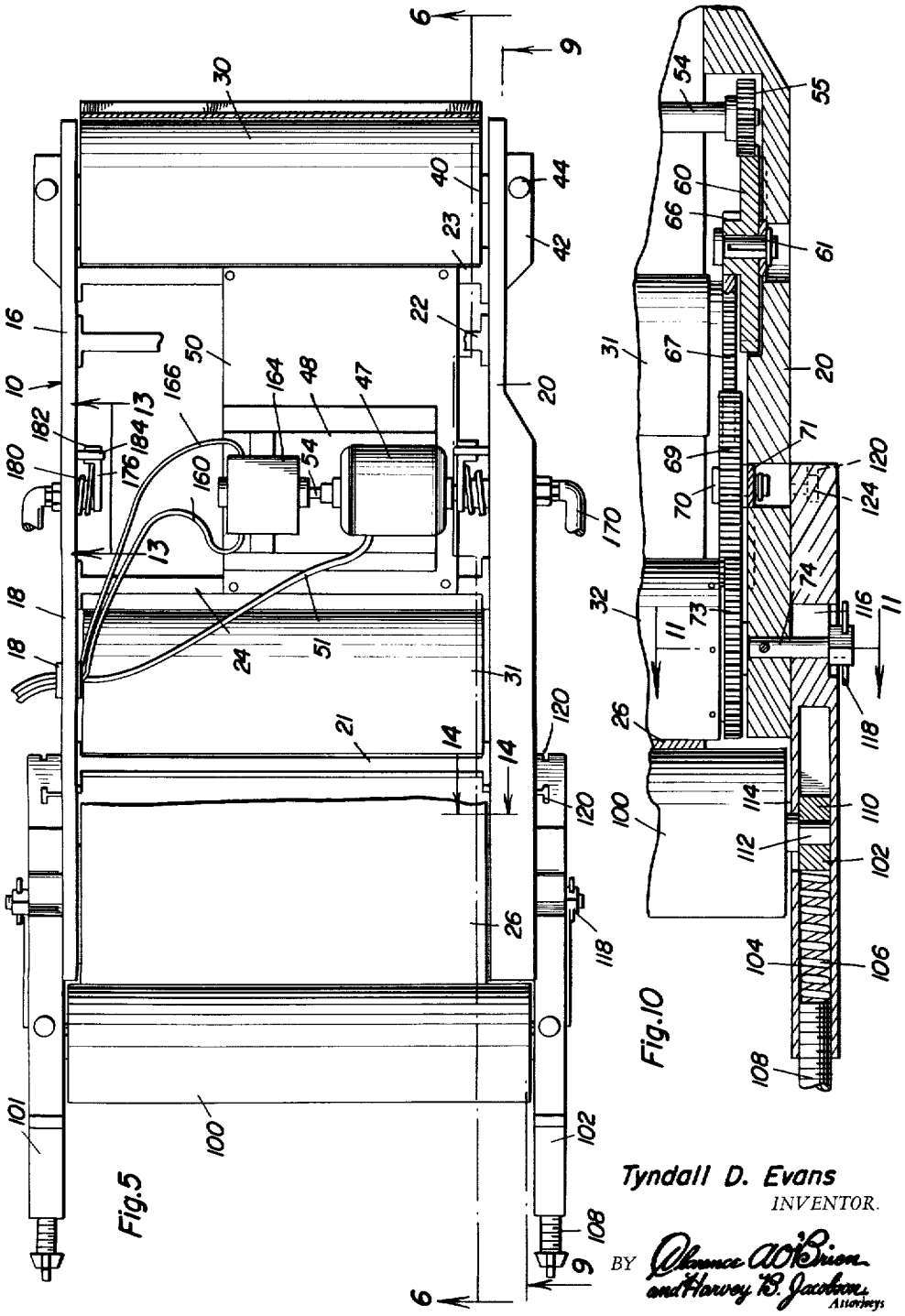
Tyndall D. Evans
INVENTOR.
BY Clarence A. O'Brien and Harvey B. Jacobson
Attorneys July 23, 1963 T. D. EVANS Re. 25,419
AUTOMATIC ELECTRIC MOP
Original Filed July 9, 1958 4 Sheets-Sheet 3
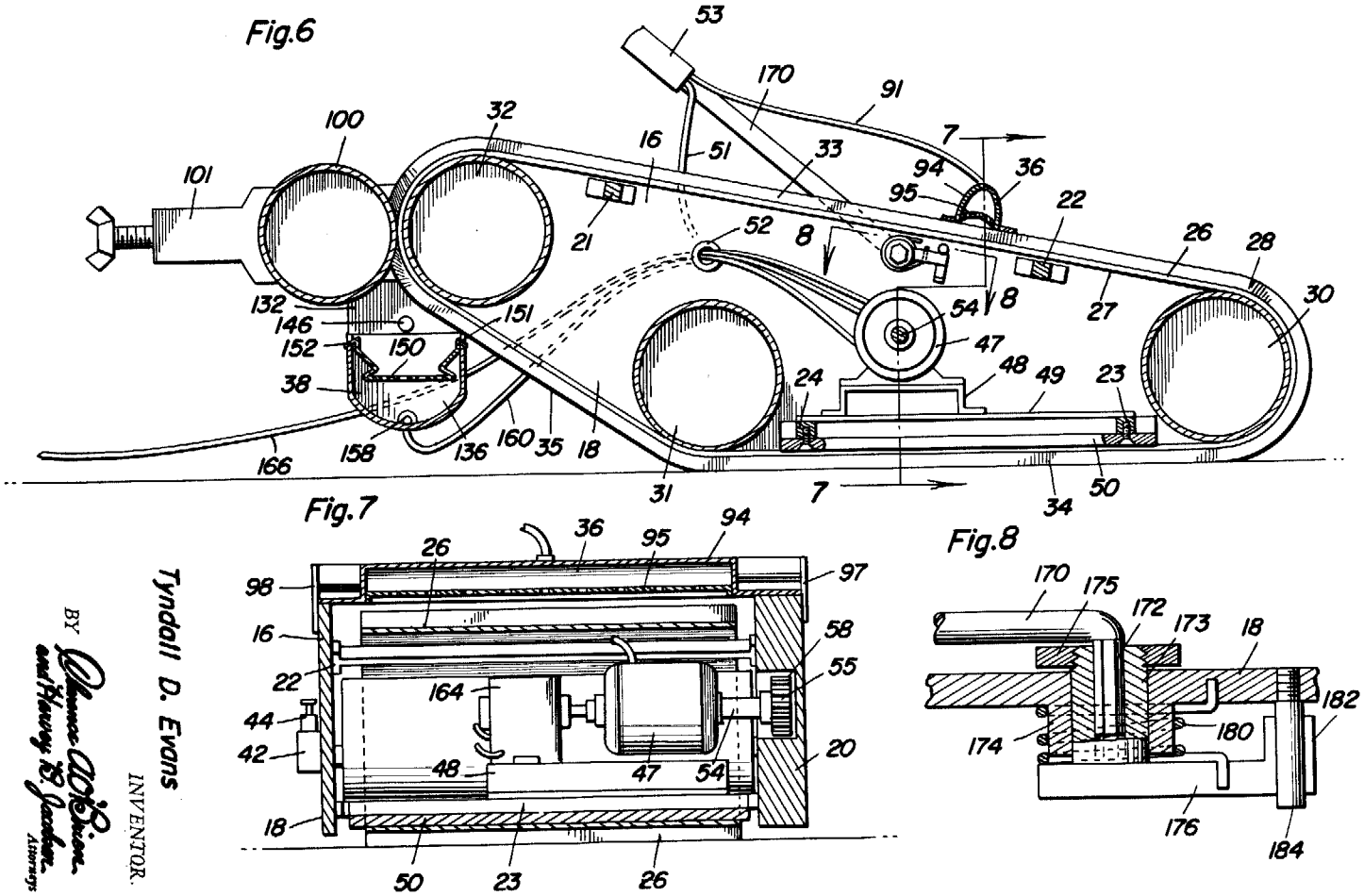
Tyndall D. Evans
INVENTOR.
BY Clarence A. O'Brien and Harvey B. Jacobson
Attorneys AUTOMATIC ELECTRIC MOP
Original Filed July 9, 1958 4 Sheets-Sheet 4
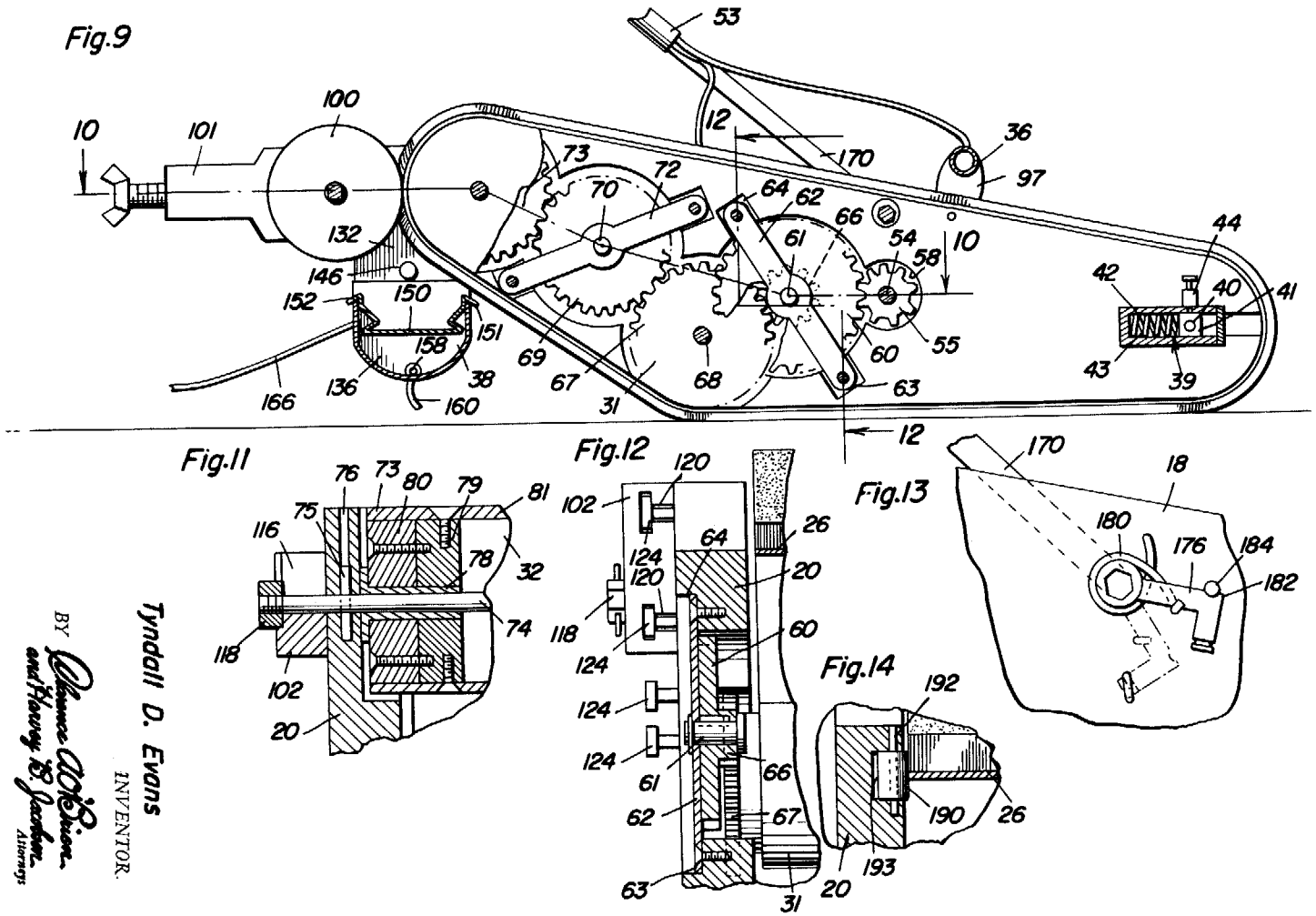
Tyndall D. Evans
INVENTOR.
BY Clarence A. O'Brien and Harvey B. Jacobson
Attorneys United States Patent Office Re. 25,419
Reissued July 23, 1963

25,419
AUTOMATIC ELECTRIC MOP

Tyndall D. Evans, Dexter, Minn.

Original No. 2,930,057, dated Mar. 29, 1960, Ser. No. 747,476, July 9, 1958. Application for reissue Mar. 27, 1961, Ser. No. 98,728
21 Claims. (Cl. 15—99)

Matter enclosed in heavy brackets [ ] appears in the original patent but forms no part of this reissue specification; matter printed in italics indicates the additions made by reissue.

This invention relates to scrubbing and cleaning and more particularly to improvements in electric mops.

[An object of the invention is to provide a structurally improved and refined portable electric mop using an endless belt as an apron by which to clean surfaces, regardless of the position of the surface. For instance, a mop constructed in accordance with the invention can be used for cleaning a floor, walls or a ceiling with liquid feed on the surface of the belt in one or more of the positions of the mop.]

*An object of my invention is to provide a novel and improved electric mop using an endless belt by which to clean surfaces.*

*A further object of my invention is to provide such a mop with an endless belt comprising a backing and a nap and with novel means for applying cleaning liquid to the nap of said belt.*

*A further object of my invention is to provide such a mop with novel and improved means for extracting the dirty liquid from the mop.*

*A still further object of my invention is to provide an electric mop to clean surfaces regardless of the position of the surface; and for example, a mop which can be used for cleaning a floor, walls or a ceiling with liquid feed on the surface of the belt in one or more of the positions of the mop.*

One of the important features of the invention is the construction of the mop using no supporting wheels, rollers or the like. The endless belt constitutes the sole supporting surface for the mop so that a comparatively equalized pressure on the surface that is being cleaned, is obtained, instead of a high local pressure in instances where wheels are used. In addition the entire mop can be made very light so that it is easily moved from one position to another, from one floor to the next or held in an overhead position for cleaning ceilings. This is true even though the preferred electric mop has a motor operated pump for scavenging the dirty liquid from the mop after it has served its purpose of cleaning the surface of a floor, wall, ceiling, etc.

The automatic electric mop has numerous structural features of importance. These will become readily apparent in following the description of the illustrated form of the invention.

FIGURE 1 is a perspective view of the mop.

FIGURE 2 is a rear view of the mop of FIGURE 1.

FIGURE 3 is a diagrammatic view of the mop of FIGURE 1 showing it used for cleaning a ceiling surface.

FIGURE 4 is a diagrammatic view of the mop showing it being used for cleaning a wall surface.

FIGURE 5 is a top view of the mop, parts broken away to illustrate otherwise hidden detail.

FIGURE 6 is a sectional view taken approximately on the line 6—6 of FIGURE 5.

FIGURE 7 is a transverse sectional view taken approximately on the line 7—7 of FIGURE 6, parts shown in elevation.

FIGURE 8 is an enlarged fragmentary sectional view taken on the line 8—8 of FIGURE 6 and showing the detail of the manner in which the handle is connected to the frame of the mop.

FIGURE 9 is a side elevational view of the mop taken on line 9—9 of FIG. 5, parts being broken away in section to show otherwise hidden details of construction .

FIGURE 10 is an enlarged sectional view taken on the line 10—10 of FIGURE 9.

FIGURE 11 is a transverse sectional view taken on the line 11—11 of FIGURE 10.

FIGURE 12 is a sectional view on an enlarged scale and taken on the line 12—12 of FIGURE 9.

FIGURE 13 is a fragmentary elevational view taken on the line 13—13 of FIGURE 5.

FIGURE 14 is an enlarged fragmentary sectional view taken on the line 14—14 of FIGURE 5 and showing one of the guides for the endless belt, contacting one of the edges of the belt to constrain the travel thereof on its rollers.

In the accompanying drawings there is an automatic electric mop 10 illustrated by way of example only of the invention. As shown in FIGURES 1, 3 and 4 the mop 10 can be used to clean surfaces at any angle in any position where the mop can be placed. For instance the mop 10 in FIGURE 1 is shown in use on the floor. The mop in FIGURE 3 is the same as the mop in FIGURE 1 but is being used to clean ceiling 12. Only minor adjustments, as will subsequently appear, are required to have the mop prepared to clean ceiling 12 or any other surface that is overhead either parallel or at an angle to the floor. The mop in FIGURE 4 is shown cleaning a vertical wall and here, only very minor adjustments are required in the mop to convert from floor or ceiling cleaning to wall cleaning.

The mop has a frame 16 provided with sides 18 and 20 connected together by a plurality of transverse braces 21, 22, 23 and 24 that are securely attached to the sides. An endless belt 26 made of a backing 27 and nap 28 or of any other suitable construction, is entrained over three rollers 30, 31 and 32, each of which is mounted for rotation between the sides 18 and 20 of frame 16. One of the rollers 31 is offset from a plane passed through the axes of rotation of rollers 30 and 32 so that when the belt 26 is entrained over the three rollers, a triangular formation results, when viewed from the side (FIGURE 6). This produces three flat cleaning areas 33, 34 and 35 made of the parts of the belt located between successive rollers 32, 30, 31 and back again to roller 32. The area 33 receives liquid from spray head 36 which will be described in detail subsequently. Area 34 is the cleaning area adapted to contact the surface that is to be cleaned (FIGURES 1, 3 and 4), while area 35 remains isolated from areas 33 and 34 and has a drip pan 38 located at an end thereof.

Roller 30, as are all of the other rollers, is hollow with a spindle extending through it or with a pair of spindles at the opposite ends thereof. These are mounted for rotation in belt tightening assemblies, such as assembly 39 (FIGURE 9). Here, spindle 40 is shown mounted in a sliding block 41 constrained to move in the small casing 42 attached to the outside surface of side 20 of the main frame of the machine. Spring 43 seats on one end of casing 42 and on the sliding block 41 and tends to push the sliding block toward the opposite end of the casing. Since the belt is entrained around roller 30, the spring 43, sliding block 41, spindle 40 and small casing 42 constitutes a part of a belt tightener, the other part being identical to this part but for the opposite end of the roller 30. A spring loaded plunger type latch 44 is carried by one wall of casing 42 and is adapted to have the plunger projected into the casing 42 to hold the sliding block 41 in one position in the casing, at which the belt 26 can be slipped from the side of the machine for removal. This also facilitates the application of the belt onto the rollers of the machine.

Rollers 31 and 32 are power driven by motor 47 located between areas 33 and 34 of the belt. The motor is on motor mount 48 that is carried by motor mounting plate 49 (FIGURE 6) attached to braces 23 and 24. These same braces also support the presser plate 50 that has a bottom surface in contact with the inner surface of the belt 26 between rollers 30 and 31 so that the belt makes firm contact when on a proper plane between rollers 30 and 31 for much more effective cleaning. Motor 47 has a line cord 51 passing through a grommet 52 in side 18 of the frame, with the line cord first connected with switch 52 on handle 53 of the machine in order that the energization of motor 47 is easily achieved by the operator. Shaft 54 that extends from the motor has a pinion 55 secured to it. The pinion is in a recess 58 in side 20 of the machine frame which also functions as a gear case. Other gearing in the gear case is seen in FIGURE 9 and includes gear 60 enmeshed with pinion 55 and mounted on spindle 61. The spindle is connected to spindle carrier plate 62 whose ends are disposed in recesses 63 and 64 in side 20 and are fixed in place, as by being bolted. A pinion 66 is made integral with gear 60 and is in mesh with gear 67 attached to the spindle 68 of roller 31. This spindle is mounted for free rotation in bearing openings carried by both sides of the frame whereby roller 31 is power operated through the gearing. The gear 67 is enmeshed with gear 69, this gear being mounted on a spindle 70 supported by gear spindle carrier plate 72 identical in construction to plate 62. The final gear in the train is gear 73 which is enmeshed with gear 69 and which is fixed to roller 32.

Roller 32 has a spindle 74 passed through it and in this instance the spindle is held fixed to the frame of the machine by pin 75 passed through an opening in the spindle 74 and located in a bore 76 in side 20. Sleeve bearing 78 is disposed on spindle 74 and is in aligned openings in collar 79 and end members 80 of roller 32. These are held in place by bolts which fasten them to each other and which fasten the cover 81 of roller 32 in place.

Handle 53 has a water control valve 90 at a convenient location thereon. A water conductor from an external source extends into the handle 53 and is connected to the valve 90. This conductor 91 then returns down, preferably through the handle that is made hollow for this purpose, and is attached to spray head 36. The spray head is made of a transverse light weight channel 94 that opens downwardly and that has an apertured plate 95 extending transversely across it above the area 33 of belt 26 (FIGURE 6). A pair of end plates 97 and 98 are secured to the end channel 94 and are attached, for instance by bolts 99, to the two sides of the frame 16. In this way the spray head can be moved over area 35 (FIGURE 3) when the mop is inverted for ceiling cleaning. The same bolts 99 or additional bolts can be used for this purpose. Other standard fastening means may be used in place of the bolts 99.

Drip tray or pan 38 is mounted beneath area 35 of belt 26 and more particularly, is located on the gravitational side of roller 32 and wringer roller 100 that is superposed or juxtaposed with respect to roller 32. It is in contact with belt 26 to squeeze the liquid therefrom when the belt is in normal operation. The means for mounting the wringer roller 100 and drip pan 38 are important since they make it possible for the automatic electric mop to be used in the various positions shown in FIGURES 1, 3 and 4 and in many other positions. Two arms or brackets 101 and 102 respectively are separably attached to sides 20 and 18 of the frame 16. They protrude rearwardly of the mop and each is constructed similarly with typical arm 102 shown in detail in FIGURE 10. It is made of a member separate from side 20 and has a cavity 104 within which spring 106 is disposed.

Setscrew 108 is threaded in cavity 104 and reacts on spring 106 to bear against sliding block 110. This sliding block is in cavity 104 and accommodates spindle 112 of wringer roller 100. Therefore the wringer roller has one end pressed firmly in contact with the belt 26, while the other end is pressed equally firmly in contact with the belt 26 by mechanism similar to that shown in FIGURE 10. In order to allow for adjustment of the roller 100 toward and away from roller 32, an amply sized slot 114 is in one wall of bracket 102 and has the spindle 112 passed through it.

In order to mount the arm or bracket 102 on side 20, spindle 74 is engaged in slot 116 but opens through one side of bracket 102 (FIGURE 1). Nut 118 is on the threaded end of spindle 74 and is used to tighten the bracket 102 in place. A pair of slots 120 and 122 which are T-shaped in cross-section, are formed in an end of arm 102 and they engage studs 124 that have heads thereon and that are secured to the side 20. As shown in FIGURE 3 and in FIGURE 4 there are a plurality of the studs so that the arm 102 can be attached to side 20 as shown in FIGURE 1 or when rotated 90° with respect to the position shown in FIGURE 1. The correct selection of studs 124 is made for shifting to the new position, while slot 116 and nut 118 as well as the end of spindle 74 is used in each position of adjustment. Since the brackets 101 and 102 can be adjusted to selected positions with respect to the frame of the machine, wringer roller 100 is capable of being located in the new positions with the brackets that support the wringer roller. At the same time, drip pan 38 is moved to the new positions because it is carried by a pair of small metal plates 130 and 132 attached to brackets 101 and 102. The end walls 134 and 136 of the drip pan are fitted on the outside surfaces of the small plates 130 and 132 and brought thereagainst to stops 138 on plates 130 and 132 in order to establish a fully engaged position of the drip pan with its plates 130 and 132. Bolt 146 in plate 130 and a similar bolt for plate 132, are engaged in slots in the end walls 134 and 136 of the drip pan and the nuts on the bolts are tightened to separably hold the drip pan in place directly beneath the point of contact of the wringer roller 100 with the belt. This construction permits the drip pan to be adjusted closer or farther from the wringer roller and held in place, such adjustment being desirable when converting between ceiling, wall and floor use.

A strainer 150 having side mounting brackets 151 and 152, engaged over the upper edges of the side walls of pan 38, extends longitudinally down the pan 38 to strain the liquid that is squeezed from the belt prior to entering the sump or lower portion of the pan. Suction tube 158 is disposed in the pan 38 and is made of a short length of a tubing with a plurality of holes in it. A water conductor 160 is attached to one end of the suction tube or a pair of such conductors are attached to both ends of the suction tube, and they attach to the inlet of pump 164 (FIGURE 7) that is on motor mount 48. The shaft of pump 164 is driven by the end of shaft 54 opposite to that which has pinion 55 secured to it. The pump outlet has the drain line 166 connected with it, and this is adapted to be connected with a pail, service drain or the like for disposal of the water.

Handle 53 is connected with the frame 16 by a special structure since the mop is to be used in all positions and must exert a supporting function beyond the expectancy of an ordinary push-type handle. Therefore, the handle 53 has a fork 170 at its lower end and the ends of the fork are constructed the same (FIGURE 8). End 172 has a non-circular inwardly directed shank mounted in a rotary bearing 173 that is carried by sleeve 174 made integral with or otherwise rigidly fixed to side 18 of frame 16. Nut 175 is attached to bearing 173 on the exterior surface of side 18, and an arm 176 is attached to the opposite end of the bearing and on the inside of the side 18. This prevents the handle fork from inadvertently becoming separated from the frame of the machine, although the handle may be removed by pulling the ends 172 outwardly of bearings 173 when belt 26 must be removed. Torsion spring 180 is engaged on sleeve 174, with one end anchored to side 18 and the other end connected with arm 76, for instance by being wrapped around it or engaging under it. The arm has stops 182 at its outer end, the stops adapted to contact pins 184 in order to limit the rotation of the arm 176 and hence, handle 53 in two directions. Torsion spring 180 tends to return the handle to a rest or a neutral position. Therefore, the handle can be rocked back and forth a limited distance against the yielding opposition or with the force of spring 180 depending on the direction of movement of the handle. However, when the limit of movement is reached, as established by stops 182 coming into contact with pin 184, the user of the electric mop can hold the entire mop supported in an upright position.

When the mop is used in any position it is desirable that the belt remain centered on the rollers 30, 31 and 32. Therefore guides (FIGURE 14) 190 are arranged to contact the side edges of the belt 26 and keep the belt in a prescribed travel. Guide 190 is made of a free turning roller on spindle 192. There is a recess 193 in side 20 for guide 190, and the major part of the roller 190 is countersunk in the recess with only enough of the roller projecting outwardly from the inside surface of side 20, to exercise its guiding functions on the edges of belt 26. Any number of guides 190 can be used, it being preferred that there be at least one roller on each side of the belt, although several rollers forming guides such as the guide shown in FIGURE 14, be used along each of the edges of the belt.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electric mop comprising a frame, a handle connected to said frame, a plurality of rollers, means rotatively mounting said rollers on said frame, an endless belt entrained over said rollers, means reacting on a first of said rollers for laterally moving said first roller in a direction to tighten said belt, an electric motor carried by said frame, means drivingly connecting said motor to at least one of the other of said rollers to propel said endless belt, a wringer roller in contact with said belt and located adjacent to a second of said plurality of rollers to squeeze liquid from the belt, a drip pan located below said wringer roller and said adjacent roller to collect the liquid squeezed from said belt, and mechanical means selectively positionable with respect to said second roller for supporting said wringer roller and said pan so that the mop may be disposed at various angles for cleaning floors, walls and ceilings with the pan located below the wringer and second rollers to collect the liquid squeezed from said belt.

2. An electric mop comprising a frame, a handle connected to said frame, a plurality of rollers, means rotatively mounting said rollers on said frame, an endless belt entrained over said rollers, means reacting on a first of said rollers for laterally moving said first roller in a direction to tighten said belt, an electric motor carried by said frame, means drivingly connecting said motor to at least one of the other of said rollers to propel said endless belt, a wringer roller in contact with said belt and located adjacent to a second of said plurality of rollers to squeeze liquid from the belt, a drip pan located below said wringer roller and said adjacent roller to collect the liquid squeezed from said belt, mechanical means selectively positionable with respect to said second roller for supporting said wringer roller and said pan so that the mop may be disposed at various angles for cleaning floors; walls and ceilings with the pan located below the wringer and second rollers to collect the liquid squeezed from said belt, said mechanical means including a pair of brackets to which said pan is secured, and resilient means carried by said brackets for pressing said wringer roller against said belt.

3. An electric mop comprising a frame, a handle connected to said frame, a plurality of rollers, means rotatively mounting said rollers on said frame, an endless belt entrained over said rollers, means reacting on a first of said rollers for laterally moving said first roller in a direction to tighten said belt, an electric motor carried by said frame, means drivingly connecting said motor to at least one of the other of said rollers to propel said endless belt, a wringer roller in contact with said belt and located adjacent to a second of said plurality of rollers to squeeze liquid from the belt, a drip pan located below said wringer roller and said adjacent roller to collect the liquid squeezed from said belt, mechanical means selectively positionable with respect to said second roller for supporting said wringer roller and said pan so that the mop may be disposed at various angles for cleaning floors, walls and ceilings with the pan located below the wringer and second rollers to collect the liquid squeezed from said belt, a spray head superposed over a part of said belt to apply liquid thereto, means for mounting said spray head in selected positions on said frame, and a liquid conductor connected to said spray head.

4. An electric mop comprising a frame, a handle connected to said frame, a plurality of rollers, means rotatively mounting said rollers on said frame, an endless belt entrained over said rollers, means reacting on a first of said rollers for laterally moving said first roller in a direction to tighten said belt, an electric motor carried by said frame, means drivingly connecting said motor to at least one of the other of said rollers to propel said endless belt, a wringer roller in contact with said belt and located adjacent to a second of said plurality of rollers to squeeze liquid from the belt, a drip pan located below said wringer roller and said adjacent roller to collect the liquid squeezed from said belt, mechanical means selectively positionable with respect to said second roller for supporting said wringer roller and said pan so that the mop may be disposed at various angles for cleaning floors, walls and ceilings with the pan located below the wringer and second rollers to collect the liquid squeezed from said belt, a spray head superposed over a part of said belt to apply liquid thereto, means for mounting said spray head in selected positions on said frame, a liquid conductor connected to said spray head, and means including a pump driven by said motor for withdrawing liquid from the bottom of said pan and for discharging the liquid.

5. An electric mop comprising a frame, a handle connected to said frame, a plurality of rollers, means rotatively mounting said rollers on said frame, an endless belt entrained over said rollers, means reacting on a first of said rollers for laterally moving said first roller in a direction to tighten said belt, an electric motor carried by said frame, means drivingly connecting said motor to at least one of the other of said rollers to propel said endless belt, a wringer roller in contact with said belt and located adjacent to a second of said plurality of rollers to squeeze liquid from the belt, a drip pan located below said wringer roller and said adjacent roller to collect the liquid squeezed from said belt, mechanical means selectively positionable with respect to said second roller for suporting said wringer roller and said pan so that the mop may be disposed at various angles for cleaning floors, walls and ceilings with the pan located below the wringer and second rollers to collect the liquid squeezed from said belt, a spray head superposed over a part of said belt to apply liquid thereto, means for mounting said spray head in selected positions on said frame, a liquid conductor connected to said spray head, means including a pump driven by said motor for withdrawing liquid from the bottom of said pan and for discharging the liquid, said belt constituting the support for the mop by contacting a supporting surface, and guides secured to said frame and contacting said belt along the edges thereof to constrain the movement of said belt on said rollers.

6. In an electric mop having a handle and a frame, means securing said handle to said frame for limited movement with respect to said frame so that said mop frame can be supported at various positions for cleaning floors, walls and ceilings, an endless belt, a plurality of rollers carried by said frame and on which said endless belt is mounted, said handle having a fork at one end between which said belt is adapted to pass, said belt being removable from said frame by slipping outwardly therefrom at the side of said frame after said handle is separated from said handle securing means, and means for extracting liquid from the belt as the belt is propelled.

7. In an electric mop having a handle and a frame, means securing said handle to said frame for limited movement with respect to said frame so that said mop frame can be supported at various positions for cleaning floors, walls and ceilings, an endless belt, a plurality of rollers carried by said frame and on which said endless belt is mounted, said handle having a fork at one end between which said belt is adapted to pass, said belt being removable from said frame by slipping outwardly therefrom at the side of said frame after said handle is separated from said handle securing means, means for extracting liquid from the belt as the belt is propelled, means including a drip pan for collecting the extracted liquid from the belt, and means including a pump for withdrawing liquid from said pan to exhaust the liquid to a remote location.

8. In an electric mop having a handle and a frame, means securing said handle to said frame for limited movement with respect to said frame so that said mop frame can be supported at various positions for cleaning floors, walls and ceilings, an endless belt, a plurality of rollers carried by said frame and on which said endless belt is mounted, said handle having a fork at one end between which said belt is adapted to pass, said belt being removable from said frame by slipping outwardly therefrom at the side of said frame after said handle is separated from said handle securing means, means for extracting liquid from the belt as the belt is propelled, means including a drip pan for collecting the extracted liquid from the belt, means including a pump for withdrawing liquid from said pan to exhaust the liquid to a remote location, a pair of arms, means attaching said arms to said frame in selected positions so that said arms may assume selected orientation with respect to said frame, said water extraction means carried by said arms, and said means for withdrawing liquid from said pan also carried by said arms so that said liquid extraction means and said liquid withdrawing means are adjusted to selected positions with respect to said frame.

9. The mop of claim 8 wherein there are a plurality of rollers carried by said frame over which said belt is entrained, resilient means reacting on at least one of said rollers to extend one of said rollers and thereby tighten the belt on said rollers.

10. The mop of claim 8 wherein there are three rollers mounted for roation in said frame and over which said belt is entrained, said liquid extracting means comprising a wringer roller mounted adjacent to one of said three rollers with the belt squeezed therebetween.

11. The mop of claim 8 wherein there is a spray head superposed with respect to said belt and extending transversely across he belt, means for attaching said spray head to selected parts of said frame so that said spray head occupies different positions relative to the belt when the mop is used for cleaning surfaces in different orientaitons.

12. The mop of claim 8 wherein there is a spray head superposed with respect to said belt and extending transversely across the belt, means for attaching said spray head to selected parts of said frame so that said spray head occupies different positions relative to the belt when the mop is used for cleaning surfaces in different orientations, said handle having a control valve thereon, and liquid conductors extending to said control valve and said spray head for controlling the admission of liquid to said spray head.

*13. An electric mop comprising a frame, a plurality of rollers, means rotatively mounting said rollers on said frame, an endless belt entrained over said rollers, electrically operated drive means for driving at least one of said rollers and said belt, liquid extracting means comprising a wringer roller mounted adjacent to one of said first mentioned rollers, means including a drip pan for collecting the extracted liquid from the belt, and means for releasably attaching the wringer roller and pan to said frame.*

*14. The structure of claim 13 in which said wringer roller and pan means for attaching the wringer roller and pan to the frame are interconnected to form a unitary structure.*

*15. An electric mop comprising a frame, a plurality of rollers, means rotatively mounting said rollers on said frame, an endless belt entrained over said rollers, electrically operated drive means for driving at least one of said rollers and said belt, said belt comprising an inwardly disposed backing and an outwardly disposed nap, the path of travel of said belt defining an area wherein said nap is adapted to engage a surface to be cleaned, a spray head, means connecting said spray head to said frame to extend transversely across said belt in overlying relation to said belt at a position remote from said area, said spray head opening toward the nap of said belt and adapted to apply liquid directly to the nap, and a liquid conductor connected to said spray head and extending from a supply of liquid.*

*16. The structure defined in claim 15 and further comprising a platen connected to said frame between a pair of said rollers and inwardly disposed with respect to said belt and having a generally flat pressure surface adapted to engage the inner surface of said belt at said area.*

*17. An electric mop comprising a frame, three rollers mounted for rotation in said frame in laterally spaced parallel relationship, a pair of said rollers having their lowermost portions disposed generally coplanar, an endless belt entrained over said rollers, electrically operated drive means for driving at least one of said rollers and said belt, said belt comprising an inwardly disposed backing and an outwardly disposed nap, that portion of said belt between said pair of rollers defining a generally horizontally disposed cleaning surface and that portion of said belt oppositely disposed from said cleaning surface being disposed generally horizontal, a spray head, means connecting said spray head to said frame whereby said spray head extends transversely across said belt in overlying relationship thereto at the generally horizontal portion thereof oppositely disposed to said cleaning surface, said spray head opening toward said nap and adapted to apply liquid directly to the nap, a liquid conductor connected to said spray head and extending from a supply of liquid, liquid extracting means comprising a wringer roller mounted adjacent to one of said first mentioned rollers, means including a drip pan for collecting the extracted liquid from the belt, and means for releasably attaching the wringer roller and pan to said frame.*

*18. The structure defined in claim 17 in which said wringer roller and pan and means for attaching the wringer roller and pan to the frame are interconnected to define a unitary structure.*

*19. An electric mop comprising a frame, three rollers*

*mounted for rotation in said frame in laterally spaced parallel relationship, a pair of said rollers having their lowermost portions disposed generally coplanar, the third of said rollers being rearwardly and upwardly disposed with respect to said pair of rollers, an endless belt entrained over said rollers, electrically operated drive means for driving at least one of said rollers and said belt, that portion of said belt between said pair of rollers defining a generally horizontally disposed cleaning surface, that portion of belt between said third roller and one of said pair of rollers extending rearwardly and upwardly at an obtuse angle to said cleaning surface generally greater than 120°, liquid extracting means comprising a wringer member mounted adjacent said third roller, said belt passing between said third roller and wringer member, that portion of the belt passing between the wringer member and third roller being generally vertically disposed, a drip pan for collecting the extracted liquid from the belt, and means mounting eaid drip pan to underlie that portion of the belt passing between the wringer member and third roller.*

*20. The structure defined in claim 19 in which one of said pair of rollers is disposed generally at the forward end of said mop, and the forward end of said mop over a substantial area of said cleaning surface is of a height generally equal to the diameter of said last mentioned roller.*

*21. The structure defined in claim 20 wherein said belt comprises an inwardly disposed backing and an outwardly disposed nap and that portion of said belt oppositely disposed from said cleaning surface is generally horizontally disposed, and further comprising a spray head, means connecting said spray head to said frame whereby said spray head extends transversely across said belt in overlying relationship at said last mentioned portion of said belt, said spray head opening toward said nap and adapted to apply liquid directly to said nap, and a liquid conductor connected to said spray head and extending from a supply of liquid.*

References Cited in the file of this patent or the original patent

UNITED STATES PATENTS

| | | |
|---|---|---|
| 1,000,699 | Seyferth | Aug. 15, 1911 |
| 1,179,427 | Hanck | Apr. 18, 1916 |
| 1,181,995 | Crawford | May 9, 1916 |
| 1,364,516 | Perkins | Jan. 4, 1921 |
| 1,882,270 | Beach | Oct. 11, 1932 |
| 1,886,852 | Truda | Nov. 8, 1932 |
| 2,181,548 | Gorey | Nov. 28, 1939 |
| 2,257,391 | McDonell | Sept. 30, 1941 |
| 2,544,174 | Ohmert | Mar. 6, 1951 |